W. V. TURNER.
LOCOMOTIVE BRAKE DEVICE.
APPLICATION FILED OCT. 25, 1917.
1,277,001.
Patented Aug. 27, 1918.
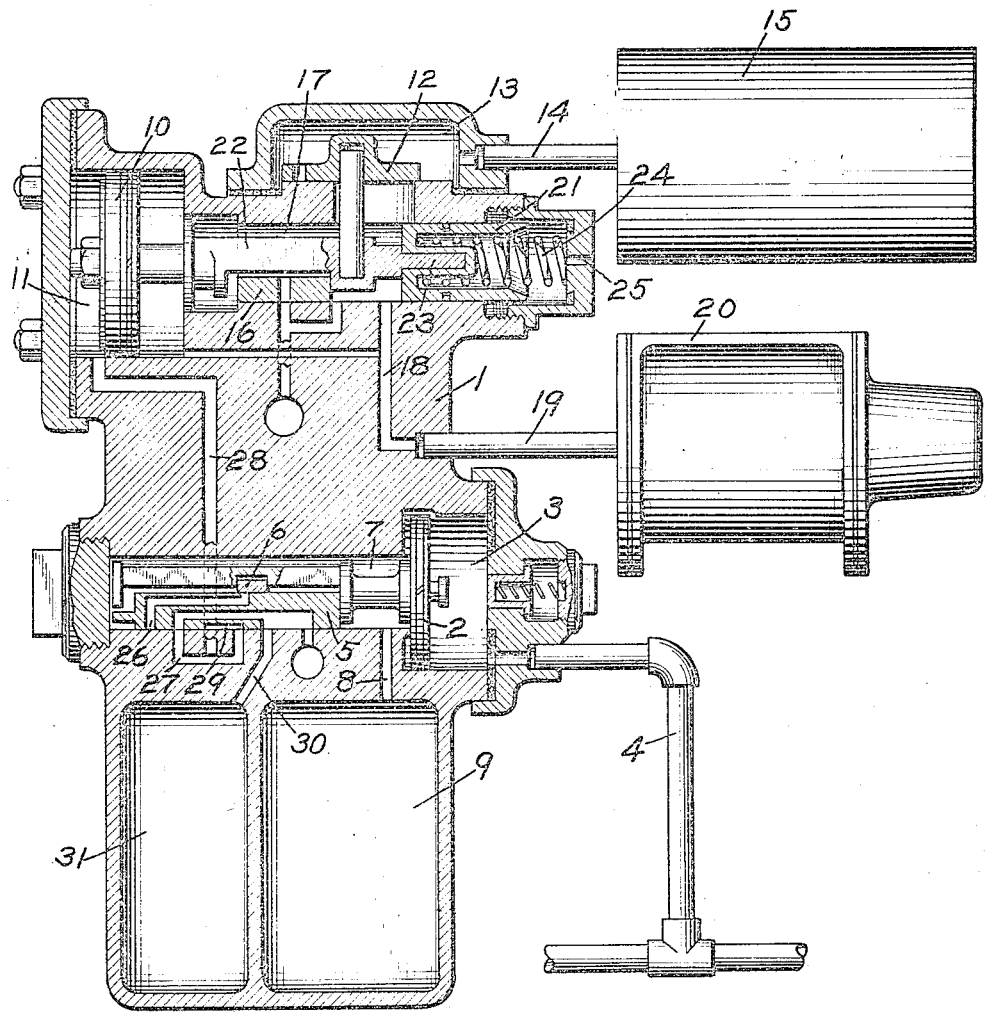
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE DEVICE.

1,277,001.   Specification of Letters Patent.   Patented Aug. 27, 1918.

Application filed October 25, 1917.   Serial No. 198,500.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive Brake Devices, of which the following is a specification.

This invention relates to fluid pressure brakes, and more particularly to a locomotive brake equipment.

It has heretofore been proposed to provide a locomotive brake equipment in which the supply of fluid to the locomotive brake cylinders is controlled by a piston subject to the opposing pressures of the brake cylinder and an application chamber.

Where a brake application is effected with an equipment of the above character, the brake cylinder pressure rises promptly with the rise in pressure in the application chamber. On the cars of the train, the supply of fluid to the brake cylinder is controlled by a triple valve device and the rise in brake cylinder pressure is dependent upon the rate of reduction in brake pipe pressure, so that the brake cylinder pressure on the cars rises more slowly than on the locomotive, thus causing a running in of the slack which is undesirable.

The principal object of my invention is to provide improved means for delaying or retarding the application of the brakes on the locomotive.

In the accompanying drawing, the single figure is a sectional view of a locomotive distributing valve device embodying my invention.

As shown in the drawing, the distributing valve device may comprise a casing 1 containing an equalizing valve device and an application and release valve device.

The equalizing valve device may comprise a piston 2 contained in piston chamber 3, connected to brake pipe 4, and adapted to operate a main slide valve 5 and an auxiliary valve 6, contained in valve chamber 7, which is connected by passage 8 with a pressure chamber 9.

The application and release valve device may comprise a piston 10, contained in piston chamber 11, an application valve 12, contained in valve chamber 13, connected by pipe 14 to reservoir 15, and a release valve 16 contained in valve chamber 17, which is connected by passage 18 and pipe 19 with brake cylinder 20.

According to my invention, a spring stop piston 21 is mounted in valve chamber 17, in alinement with the piston stem 22 of piston 10 and is provided with a socket for receiving a reduced projecting portion 23 of the stem 22.

The stop piston 21 is subject on one side to the pressure of a spring 24 and the spring side of the piston is open to the atmosphere through a port 25.

In operation, when an application of the brakes is effected, the equalizing piston 2 is operated upon a reduction in brake pipe pressure to shift the main slide valve 5 and the auxiliary slide valve 6, so that fluid under pressure is supplied from valve chamber 7 and the pressure chamber 9 through port 26 to passage 27 and thence through passage 28 to piston chamber 11, a cavity 29 being provided for connecting the passage 27 with a passage 30 leading to application chamber 31.

The piston 10, however, is not moved from release position until the pressure in the piston chamber 11 has been increased to a predetermined degree, slightly exceeding the resisting pressure of the spring 24. When this predetermined pressure has developed, the piston 10 is moved and the stop piston 21 is shifted to its outer seat, compressing the spring 24.

As the brake cylinder pressure increases, the effective pressure of the spring 24 on the piston stem 22 is reduced, until at a predetermined brake cylinder pressure, the spring pressure is entirely balanced, so that thereafter, the application piston is not influenced by the action of the spring.

It will thus be seen that while the application of the brakes is initially retarded on the locomotive, the brake cylinder pressure can be increased, if desired, to substantially equal the pressure in the application chamber, since the application piston is not influenced by the spring 24 after the brake cylinder pressure has been increased to a predetermined degree.

In releasing the brakes, when the brake cylinder pressure has decreased to a predetermined degree, the spring 24 will again act and with increasing force as the brake cylinder pressure is further reduced, so that the final release of the brakes is made more certain, since the spring 24 aids the brake cylinder pressure in shifting the application piston 10 to full release position.

Having now described my invention, what I claim as new and desire to secure by Letters Patent, is:

1. In a fluid pressure brake, the combination with a brake cylinder, of a valve device having a piston subject to the opposing pressures of the brake cylinder and an application chamber for effecting an application of the brakes and a stop device subject on one side to brake cylinder pressure and on the opposite side constantly to atmospheric pressure and the pressure of a spring for opposing the movement of said piston.

2. In a fluid pressure brake, the combination with a brake cylinder, of a valve device having a piston subject to the opposing pressures of the brake cylinder and an application chamber, a valve operated by said piston upon an increase in pressure in the application chamber for supplying fluid to the brake cylinder, and a piston stop device acting on said piston and subject on one side to brake cylinder pressure and on the opposite side constantly to atmospheric pressure and the pressure of a spring for initially retarding the application of the brakes.

3. In a fluid pressure brake, the combination with a brake cylinder, of a valve device having a piston subject to the opposing pressures of the brake cylinder and an application chamber, a valve operated by said piston upon an increase in pressures in the application chamber for supplying fluid to the brake cylinder, and a piston stop device acting on said piston and subject on one side to brake cylinder pressure and on the opposite side constantly to atmospheric pressure and the pressure of a spring for initially retarding the application of the brakes, the spring stop device being cut out of action at a predetermined brake cylinder pressure.

In testimony whereof I hereunto set my hand.

WALTER V. TURNER.